United States Patent
Chang et al.

(10) Patent No.: US 9,141,797 B1
(45) Date of Patent: Sep. 22, 2015

(54) DETECTION OF FAKE ANTIVIRUS IN COMPUTERS

(71) Applicant: TREND MICRO INCORPORATED, Tokyo (JP)

(72) Inventors: Chia-Chi Chang, Taipei (TW); Sheng-Chuan Yen, Taipei (TW); Che-Fu Yeh, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/189,730

(22) Filed: Feb. 25, 2014

Related U.S. Application Data

(63) Continuation of application No. 13/243,498, filed on Sep. 23, 2011, now Pat. No. 8,700,913.

(51) Int. Cl.
| | |
|---|---|
| *G06F 12/14* | (2006.01) |
| *G06F 7/04* | (2006.01) |
| *G06F 21/56* | (2013.01) |
| *H04L 29/06* | (2006.01) |
| *G06F 21/57* | (2013.01) |

(52) U.S. Cl.
CPC .............. *G06F 21/56* (2013.01); *G06F 21/563* (2013.01); *G06F 21/565* (2013.01); *G06F 21/577* (2013.01); *H04L 63/145* (2013.01); *H04L 63/1416* (2013.01)

(58) Field of Classification Search
CPC . H04L 63/145; H04L 63/1416; G06F 21/563; G06F 21/565; G06F 21/577
USPC .................................... 713/188; 726/3, 24, 25
See application file for complete search history.

(56) References Cited

U.S. PATENT DOCUMENTS

| | | | |
|---|---|---|---|
| 8,700,913 B1* | 4/2014 | Chang et al. .................. | 713/188 |
| 2003/0145197 A1* | 7/2003 | Lee et al. ...................... | 713/155 |
| 2008/0022405 A1* | 1/2008 | Wang et al. ..................... | 726/23 |
| 2008/0172741 A1* | 7/2008 | Reumann et al. ............... | 726/23 |
| 2012/0159620 A1* | 6/2012 | Seifert et al. .................... | 726/22 |
| 2013/0019310 A1* | 1/2013 | Ben-Itzhak et al. ............ | 726/23 |

* cited by examiner

*Primary Examiner* — Aravind Moorthy
(74) *Attorney, Agent, or Firm* — Okamoto & Benedicto LLP

(57) ABSTRACT

Detection of fake antivirus includes classifying text content of a user interface of an application program and scanning files associated with the application program for suspicious code. The user interface may be a graphical user interface (GUI) window of the application program. The text content may be obtained from a painted portion of the GUI window and by intercepting text changing operations performed on the GUI window. The text content may be input to a learning model to determine whether or not the application program belongs to the antivirus category. The application program is deemed to be fake antivirus when the application program is classified as belonging to the antivirus category and has a file with suspicious code.

16 Claims, 8 Drawing Sheets

System Security
protect your pc

System Security: System Scan

| Type | Run Type | Name | Details |
|---|---|---|---|
| Spyware | C:/windows/syst.. | Spyware.IEMonster.d | Steals passwords from Inter.... |
| Adware | autorun | Ziob.PornAdvertiser.ba | Adware that displays pop-u... |
| Spyware | autorun | Spyware.IMMonitor | Program that can be used to.... |
| Backdoor | C:/windows/syst.. | Win32.Rbot.fm | An IRC controlled backdoor.... |
| Trojan | autorun | Infostealer.Banker.E | Steals sensitive information fr... |
| Dialer | C:/windows/syst.. | Dialer.Xpehbam.biz_dialer | A Dialer that loads pornogra... |
| Spyware | autorun | Spyware.KnownBadSites | Uses the Windows hosts file t... |
| Trojan | autorun | Trojan.Tooso | Trojan.Tooso is a trojan whi... |
| Trojan | C:/windows/syst.. | Trojan.MailGrabber.s | Trojan horse that gets access... |
| Trojan | C:/windows/syst.. | Trojan.Alg.t | Trojan program that can co.... |
| Rogue | C:/ProgramFiles... | Trusted/Antivirus | A corrupt and misleading an... |

Scan progress

Scanning
Path     C:\Documents and Settings\admin\ 桌面 \WinHex 11.8\winhex.cnt
Infections   11

- System Scan
- Protection
- Privacy
- Update
- Settings

Registration   Update   Support

Save Report   Stop   Remove

Get full real-time protection with System Security

FIG. 2 (Prior Art)

DETECTION OF FAKE ANTIVIRUS IN COMPUTERS

CROSS-REFERENCE TO RELATED APPLICATION

This application is a continuation of U.S. application Ser. No. 13/243,498, filed Sep. 23, 2011, which is incorporated herein by reference.

BACKGROUND OF THE INVENTION

1. Field of the Invention

The present invention relates generally to computer security, and more particularly but not exclusively to methods and apparatus for detecting fake antivirus in computers.

2. Description of the Background Art

Computer viruses, worms, Trojans, rootkits, and spyware are examples of malicious codes that have plagued computer systems throughout the world. Although there are technical differences between each type of malicious code, technology for detecting malicious codes is also generally referred to as "antivirus." Malicious codes have become so widespread that experienced computer users have some form of antivirus in their computers.

Fake antivirus, also referred to as simply "Fake AV," comprises malicious code disguised as an antivirus. Fake antivirus typically mirrors the layout and behavior of legitimate (i.e., non-malicious) antivirus, and is relatively difficult to detect using conventional antivirus technology. For example, conventional pattern matching algorithms may be employed to detect program icons and keywords in program shortcuts, registry, and files employed by fake antivirus. However, icons and keywords are easily changed by fake antivirus programmers, making fake antivirus difficult to detect by conventional pattern matching. Worse, fake antivirus may also be packed (i.e., compressed) as an executable file and use a legitimate-looking graphical user interface (GUI).

SUMMARY

In one embodiment, a method of detecting fake antivirus in a computer includes retrieving text content of a graphical user interface (GUI) window of an application program, classifying the text content to determine that the application program belongs to an antivirus category, and scanning a file associated with the application program for suspicious code indicative of a fake antivirus. The application program is deemed to be fake antivirus based on a finding that the application program belongs to the antivirus category and the file associated with the application program has suspicious code indicative of a fake antivirus.

In another embodiment, a method of preventing reception of fake antivirus in a computer includes determining a reputation of a website, classifying text content of a web page of the website in response to finding that the website has an unknown reputation, and finding that the website belongs to an antivirus category based on classification of the text content. In response to finding that the website belongs to the antivirus category, the website is evaluated to determine whether the website belongs to a legitimate antivirus vendor before allowing download of a file from the website to the computer.

In another embodiment, a method of detecting fake antivirus in a computer comprises receiving text content from a user interface of an application program, finding that the application program belongs to an antivirus category based on a classification of the text content, and scanning a file associated with the application program for suspicious code indicative of a fake antivirus.

These and other features of the present invention will be readily apparent to persons of ordinary skill in the art upon reading the entirety of this disclosure, which includes the accompanying drawings and claims.

DESCRIPTION OF THE DRAWINGS

FIG. 2 shows a screen shot of a graphical user interface (GUI) of a notorious fake antivirus known as "System Security."

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
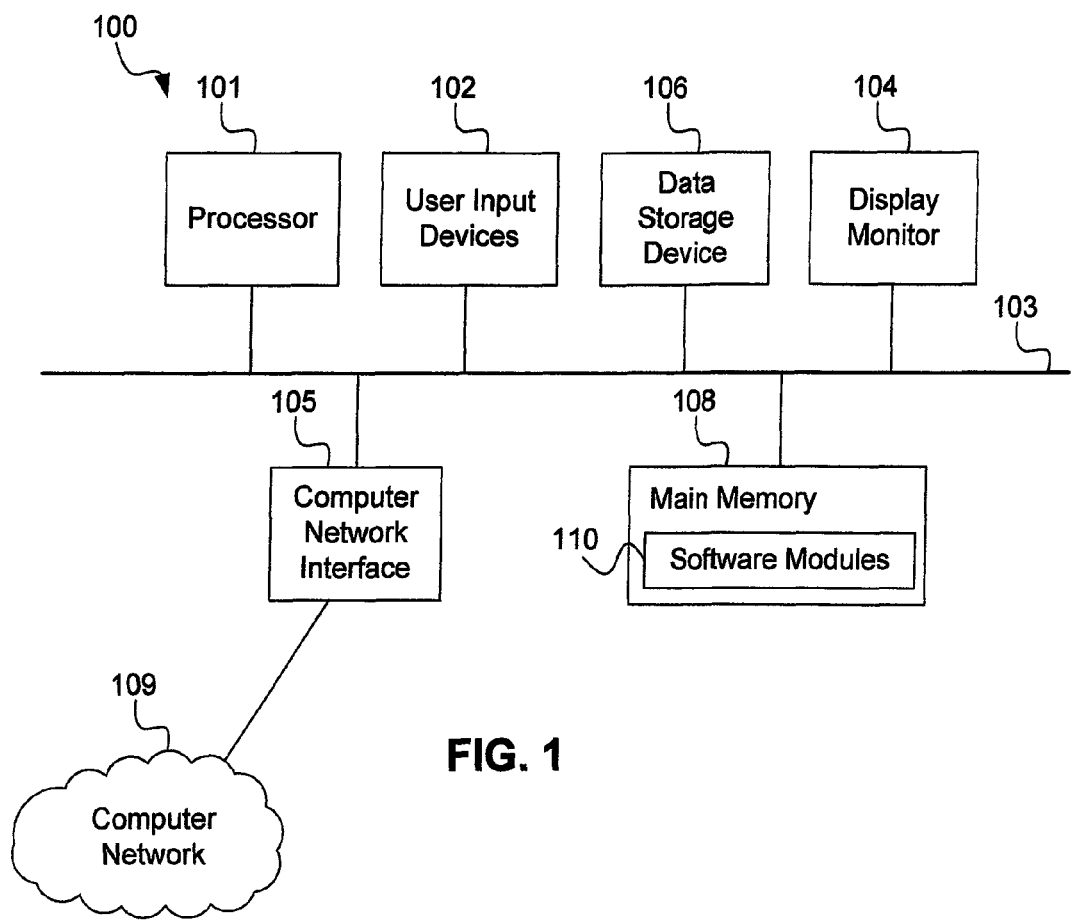
FIG. 1 shows a schematic diagram of a computer in accordance with an embodiment of the present invention.

FIG. 1 shows a schematic diagram of a computer 100 in accordance with an embodiment of the present invention. The computer 100 may be employed detect fake antivirus. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices. In the example of FIG. 1, the software modules 110 comprise an antivirus 560 and an operating system 570, which are later described in connection with FIG. 5.

Figure 3:
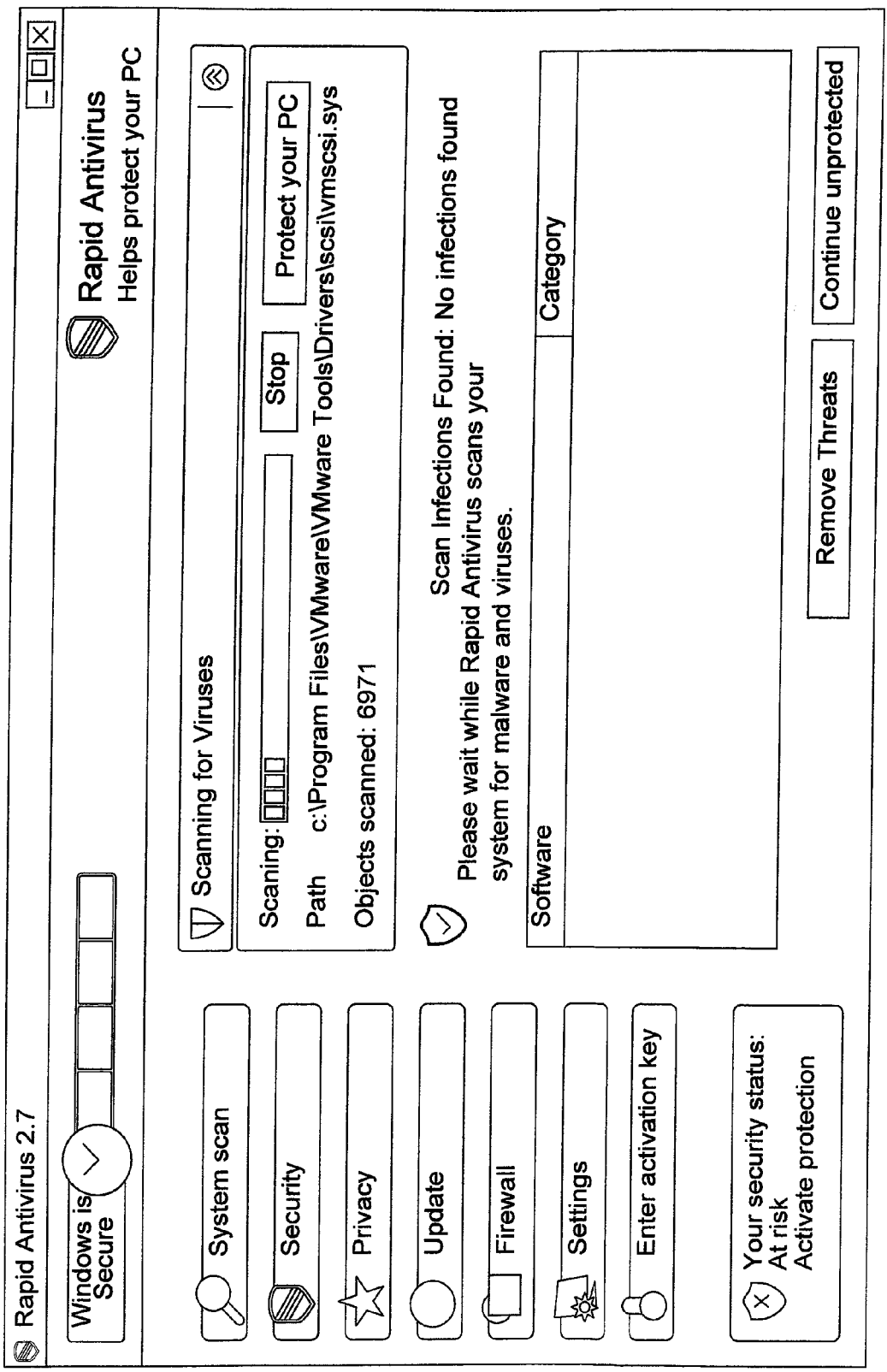
FIGS. 3 and 4 show screenshots of another fake antivirus known as "Rapid Antivirus."
Figure 4:
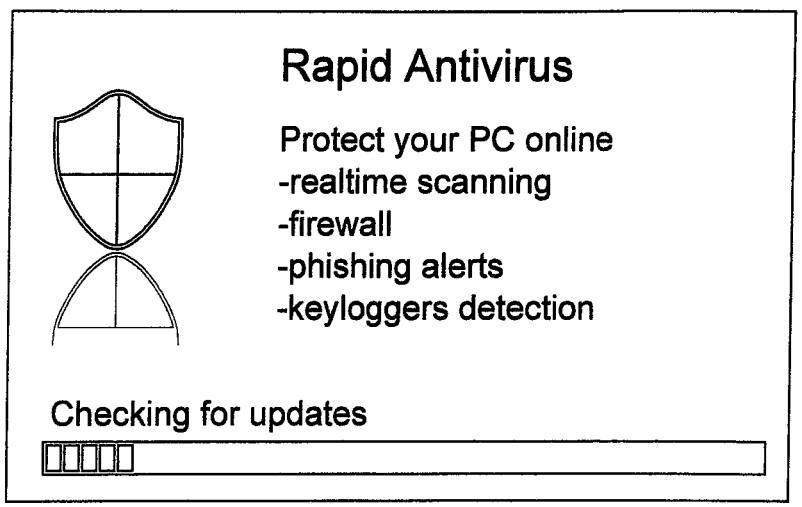

FIG. 2 shows a screen shot of a graphical user interface (GUI) of a notorious fake antivirus known as "System Security." System Security comprises malicious code but appears like legitimate antivirus software from a reputable computer security vendor. System Security has a highly convincing social-engineering GUI design that fools average computer users into believing that it is legitimate. FIGS. 3 and 4 show screenshots of another fake antivirus known as "Rapid Antivirus." FIG. 3 shows a GUI of Rapid Antivirus, while FIG. 4 shows a message window displayed by Rapid Antivirus when supposedly checking for an online update.

Figure 5:
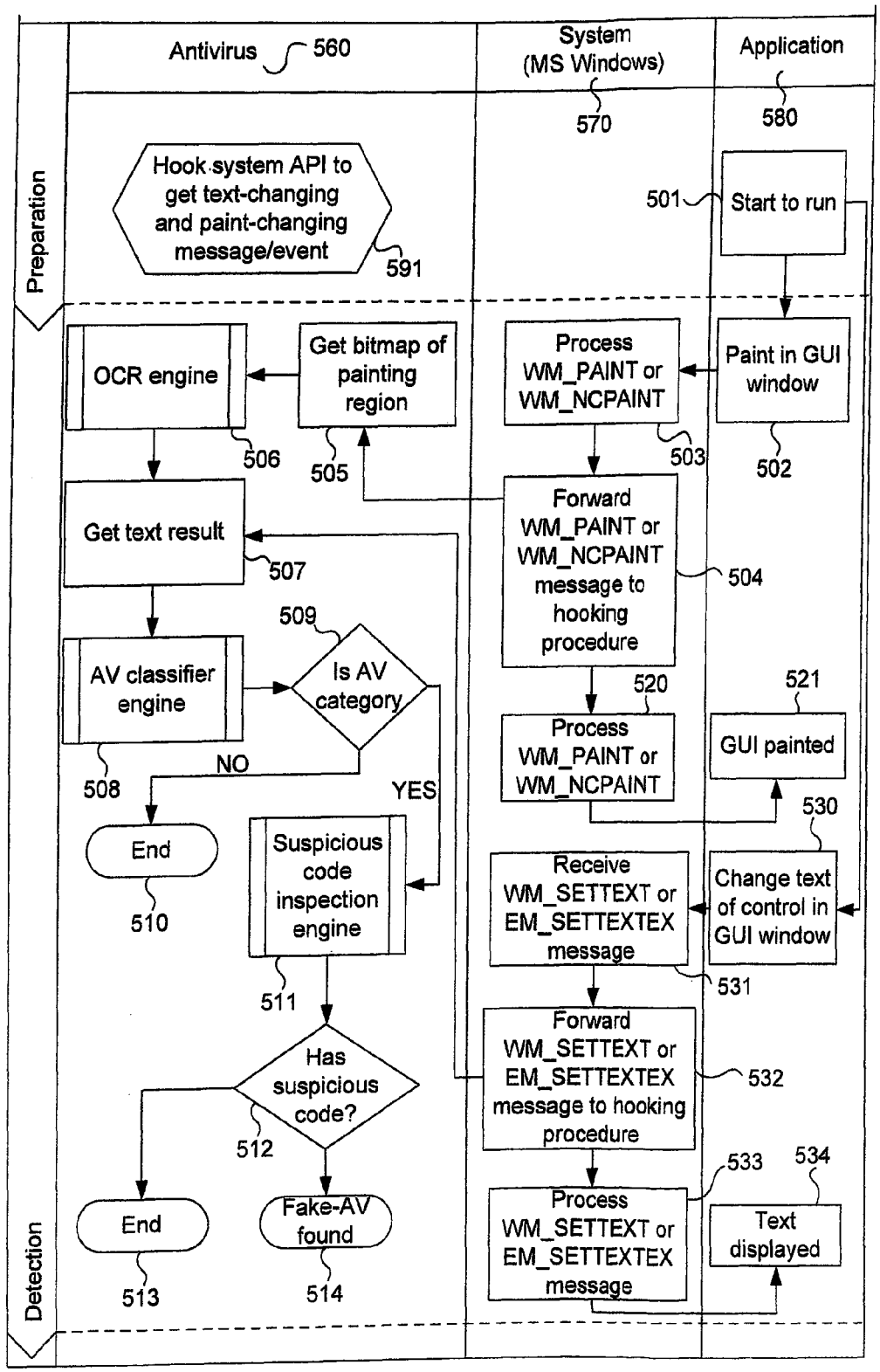
FIG. 5 shows a flow diagram illustrating operation of the computer of FIG. 1 to detect fake antivirus, in accordance with an embodiment of the present invention.

Referring now to FIG. 5, there is shown a flow diagram illustrating operation of the computer 100 to detect fake antivirus, in accordance with an embodiment of the present invention. The computer 100 may performs steps of the flow diagram of FIG. 5 as programmed with the antivirus 560 and the operating system 570. In the example of FIG. 5, the computer 100 is also executing computer-readable program code of the application 580, which is the target software, i.e., the software being evaluated, in this example. The application 580 is an application program that may or may not be fake antivirus.

The antivirus 560 may comprise antivirus software for detecting fake antivirus. In one embodiment, the antivirus 560 comprises computer-readable program code configured (a) to get the contents (e.g., text) from the user interface window, e.g., GUI, of the target software, (b) determine the classification of the target software, (c) determine if files of the target software contain suspicious code, and (d) deem the target software as fake antivirus when the target software is classified as an antivirus and files of the target software contain suspicious code. An example high-level pseudo code for detecting fake antivirus is as follows:

Get content (text) from user interface windows of target software
IF (Content is classified as AV category) AND (Suspicious code is found in software files)
THEN
The target software would be a Fake-AV.
END IF In the example of FIG. 5, the antivirus 560 further comprises an optical character recognition (OCR) engine 506, an antivirus classifier engine 508, and a suspicious code inspection engine 511. The OCR engine 506 may comprise computer-readable program code for extracting text from graphical images, including bit maps of images, displayed in graphical user interfaces. The OCR engine 506 may employ conventional OCR algorithms.

The antivirus classifier engine 508 may comprise computer-readable program code for classifying contents of user interface windows, such as the GUI of the target software (i.e., the software being evaluated). In one embodiment, the antivirus classifier engine 508 determines whether or not the target software belongs to the antivirus category based on the classification of the text content of the user interface window of the target software. Classifier algorithms that may be employed by the antivirus classifier engine 508 include Bayesian classifier and Support Vector Machine (SVM). For example, an SVM (or other classifier) learning model may be trained using text contents of user interfaces of known legitimate antivirus software. The learning model may also be trained using text contents of user interfaces of known fake antivirus. For example, the GUI of FIG. 2 includes computer security related keywords, such as "System Scan," "Scan progress", "scanning", "Trojan," and "Spyware." Similarly, the GUI of FIG. 3 includes the computer security related keywords "Antivirus", "scanning", "Firewall" and "Infections", while the message window of FIG. 4 includes the computer security related keywords "real time scanning", "firewall," "phishing alerts," and "keyloggers detection." These computer security related keywords may be used as samples to train the learning model. The learning model may be employed by the antivirus classifier engine 508 to determine whether another set of keywords, and thus the target software from which the keywords where extracted, belongs to the antivirus category.

The suspicious code inspection engine 511 may comprise computer-readable program code for detecting suspicious code in files associated with the target software. For example, the suspicious code inspection engine 511 may scan the executable file of the application 580. In one embodiment, the suspicious code inspection engine 511 is configured to identify files of the target software and scan the identified files for suspicious code. The files of the target software may be scanned for computer-readable program code that is not necessarily known malicious code but is indicative of fake antivirus. In one embodiment, the suspicious code inspection engine 511 scans the files of the target software for obfuscated binary code. Examples of obfuscated binary code include packed (i.e., compressed) code.

In one embodiment, the operating system 570 comprises the Microsoft Windows™ operating system. Accordingly, the following description provides programming examples for the Microsoft Windows™ operating system. As can be appreciated, embodiments of the present invention may also be employed with other operating systems without detracting from the merits of the present invention.

The flow diagram of FIG. 5 includes a preparation phase and a detection phase. The preparation phase includes hooking application programming interface (API) calls to get text-changing and paint-changing messages or events (FIG. 5, 591). This allows the antivirus 560 to intercept API calls and get the text content of the GUI of the target software, which in this case is the application 580. The detection phase is when evaluation of the target software is performed, which in this example begins after the application 580 executes (FIG. 5, 501).

The application 580 renders its user interface by painting its GUI window on the computer screen (FIG. 5, 502). The application 580 receives WM_PAINT and WM_NCPAINT painting messages when the Microsoft Windows™ operating system makes a request to paint a portion of a GUI window. By using the SetWindowLong/SetWindowLongPtr API to subclass the WindowProc procedure of the target GUI window, every painting rectangle (e.g., x, y, width and height) of the target GUI window may be intercepted by the antivirus 560. The antivirus 560 may then employ the BitBlt API to copy the bitmap data in the painting rectangle.

The operating system 570 receives the painting messages (FIG. 5, 503) and forwards the painting messages to the antivirus 560 (FIG. 5, 504) by way of a hooking procedure established in the preparation phase (see FIG. 5, 591). The operating system 570 processes the painting messages (FIG. 5, 520), resulting in the GUI being painted on screen (FIG. 5, 521).

In addition to painting text on the GUI, the application 580 may also set text on portions of the GUI by performing text change operations (FIG. 5, 530). The application 580 may employ the SetWindowText(HWND hWnd, LPCTSTR lpString) API to change text of its GUI window. The SetWindowText API resides in USER32.DLL of the Microsoft Windows™ operating system. By hooking the SetWindowText API, the antivirus 560 may intercept and obtain text content of the GUI of the application 580. The application 580 may also send the WM_SETTEXT and EM_SETTEXTEX messages to its GUI window to change text. Text and messages about to be sent to the GUI window may thus be intercepted and obtained by hooking the SendMessage/PostMessage API or by using SetWindowLong/SetWindowLongPtr API to subclass the WindowProc procedure of the GUI window.

In the example of FIG. 5, the operating system 570 receives text change messages from the application 580 (FIG. 5, 531). The operating system 570 forwards the text change messages to the antivirus 560 (FIG. 5, 532) by way of a hooking procedure established in the preparation phase (FIG. 5, 591). The operating system 570 processes the text change messages (FIG. 5, 533), resulting in text being displayed in the GUI of the application 580 (FIG. 5, 534).

The antivirus 560 gets the bitmap of the painting region of the GUI of the application 580 (FIG. 5, 505) and inputs the bitmap to the OCR engine 506, which converts the bitmap into text. The text content of the GUI of the application 580 comprises the text output of the OCR engine 506 and the text intercepted from the text change operations (FIG. 5, 507). The text content of the GUI of the application 580 is input to the antivirus classifier engine 508 for classification.

The antivirus classifier engine 508 determines whether or not the application 580 belongs to the antivirus category by classifying the text content of the GUI window of the application 580 (FIG. 5, 509). If the application 580 does not belong to the antivirus category, i.e., the application 580 is not an antivirus, the application 580 is not deemed to be fake antivirus and the detection process ends (FIG. 5, 510). If the application 580 belongs to the antivirus category, the suspicious code inspection engine 511 scans the files associated with the application 580 for suspicious code (FIG. 5, 512).

The antivirus 560 deems the application 580 to be fake antivirus when the application 580 belongs to the antivirus category and one or more files associated with the application 580 contain suspicious code (FIG. 5, 514). Otherwise, when the suspicious code inspection engine 511 does not find suspicious code in the files associated with the application 580, the antivirus 560 does not deem the application 580 to be fake antivirus (FIG. 5, 513).

Figure 6:
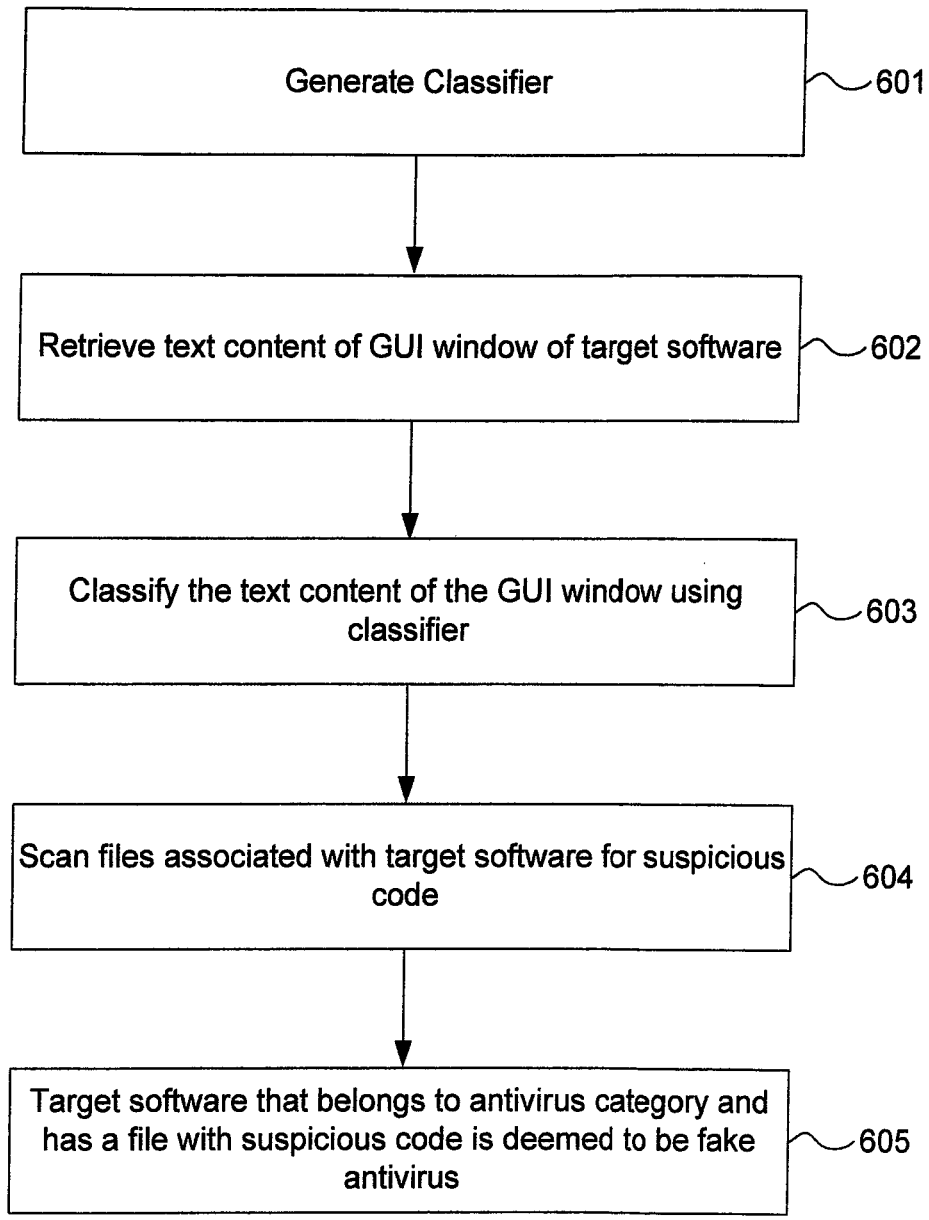
FIG. 6 shows a flow diagram of a method of detecting fake antivirus in accordance with an embodiment of the present invention.

FIG. 6 shows a flow diagram of a method of detecting fake antivirus in accordance with an embodiment of the present invention. In the method of FIG. 6, a classifier for determining whether or not the target software belongs to the antivirus category is generated (step 601). The classifier may comprise a learning model trained using texts of a plurality of known antivirus software. Text content of the GUI window of the target software is obtained (step 602) and input to the classifier for classification (step 603). Files associated with the target software, such as the executable file of the target software (i.e., the file executed to launch the process of the target software), are scanned for presence of suspicious code (step 604). The target software is deemed to be fake antivirus when it belongs to the antivirus category and has a file with suspicious code (step 605). Otherwise, the target software is not deemed to be fake antivirus.

Figure 7:
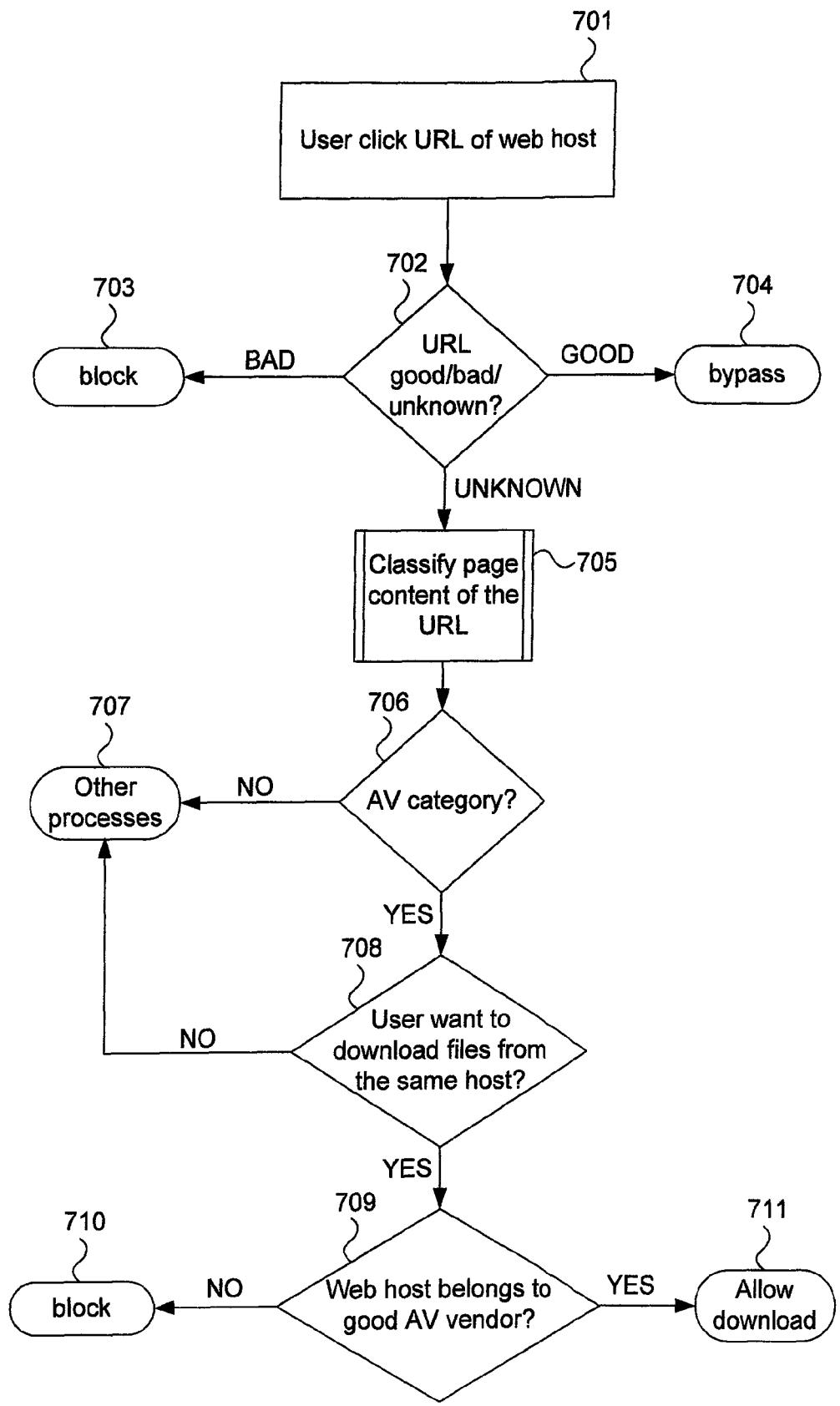
FIG. 7 shows a flow diagram of a method of preventing reception of fake antivirus in a computer, in accordance with an embodiment of the present invention.

FIG. 7 shows a flow diagram of a method of preventing reception of fake antivirus in a computer, in accordance with an embodiment of the present invention. In the example of FIG. 7, the detection of the fake antivirus may be performed by the antivirus 560 before the fake antivirus is received in the computer 100.

The antivirus 560 may be further configured to determine a reputation of a web host, such as a website. The reputation of a website indicates whether the website is a known good, known bad, or unknown website. When the user of the computer 100 clicks on a URL (uniform resource locator) of a website (step 701), the antivirus 560 determines the reputation of the website based on its URL (step 702). For example, the antivirus 560 may provide the URL of the website to a remotely located web reputation service, which maintains a reputation database. The reputation database may indicate whether the URL belongs to a known good website (e.g., legitimate websites) or to a known bad website (e.g., pornography, phishing, virus distributor, etc. website). It is also possible that the reputation database has no information on the website, in which case the website has an unknown reputation. The web reputation service returns the reputation of the website to the antivirus 560. The antivirus 560 may be configured to block communications with the website if the website has a known bad reputation (step 703) and to allow communications with the website (including downloading of files from the website) if the website has a known good reputation (step 704). As can be appreciated, rather than consulting a remote web reputation service to determine the reputation of the website, the antivirus 560 may instead consult a local reputation database.

When the website has an unknown reputation, the antivirus 560 may be configured to receive the text content of a web page served by the website. The antivirus 560 may input the text content of the web page to the antivirus classifier engine 508 (see FIG. 5) to determine whether or not the website belongs to the antivirus category based on the classification of the text content of its web page. Other processes not related to detection of fake antivirus may take over when the web page does not belong to the antivirus category (step 706 to step 707) or when the user does not want to download files from the website (step 708 to step 707).

When the text content of the web page indicates that the website belongs to the antivirus category and the user wants to download files from the website (step 706 to step 708 to step 709), the antivirus 560 may determine whether the website belongs to a legitimate antivirus vendor. For example, the antivirus 560 may consult a local or remote database containing signatures, URLs, hash values, or other indicators of web pages/websites maintained by legitimate antivirus vendors to determine whether the website belongs to a legitimate antivirus software vendor noted in the database (step 709). If so, the antivirus 560 allows download of files from the website to the computer 100 (step 711). Otherwise, when the website does not belong to a reputable antivirus software vendor, the antivirus 560 blocks download of files from the website (step 710).

Figure 8:
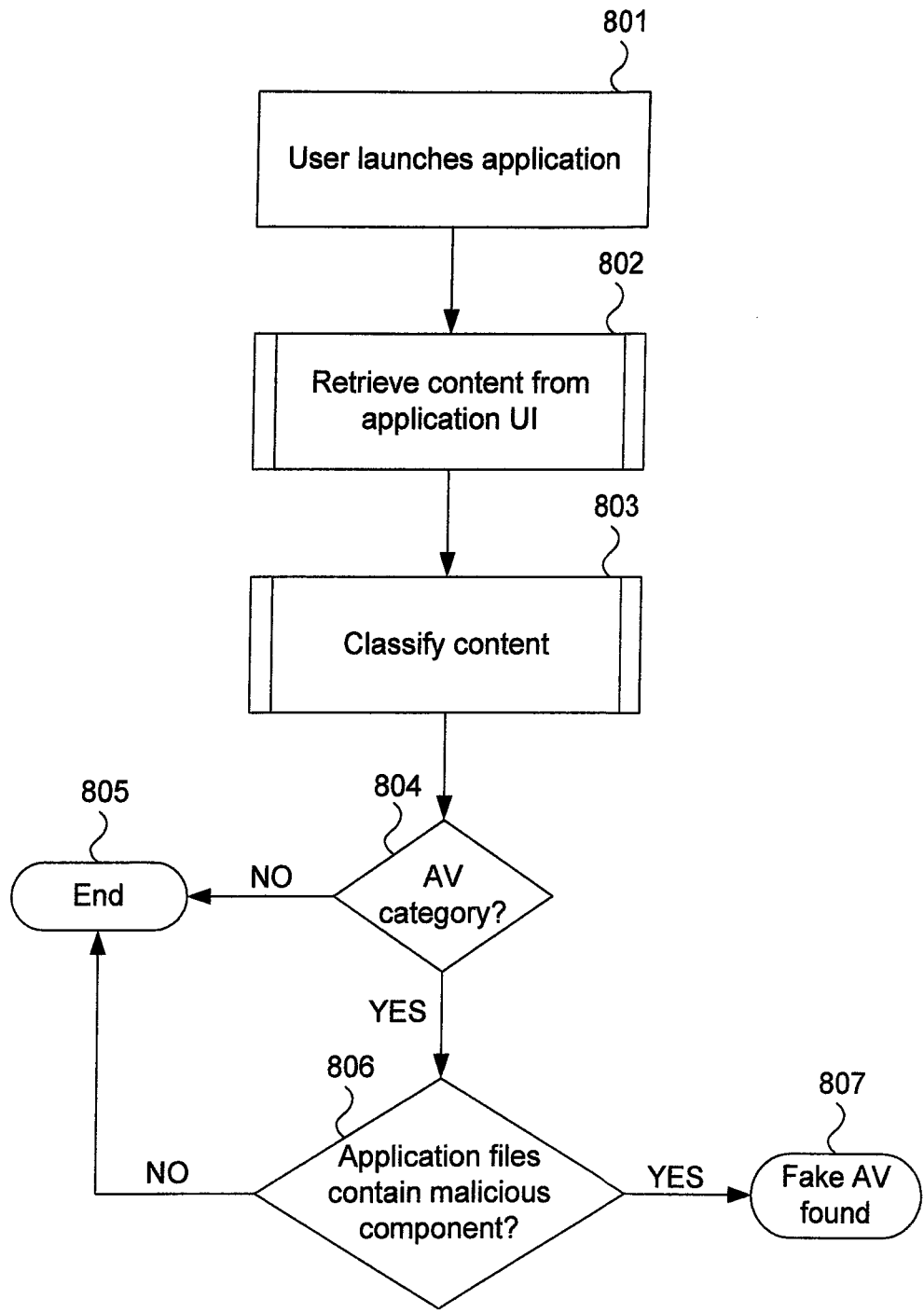
FIG. 8 shows a flow diagram of a method of detecting fake antivirus in accordance with an embodiment of the present invention.

FIG. 8 shows a flow diagram of a method of detecting fake antivirus in accordance with an embodiment of the present invention. The method of FIG. 8 is performed when the user launches an application program in the computer 100 (step 801). The antivirus 560 retrieves the text content of a user interface of the application program (step 802) and feeds the text content to the antivirus classifier engine 508 for classification (step 803). The application program is not a fake antivirus when the application program does not belong to the antivirus category (step 804 to step 805).

Otherwise, when the application program is classified as belonging to the antivirus category, the antivirus 560 initiates scanning of files associated with the application program using the suspicious code inspection engine 511 (step 806). The application program is not a fake antivirus when the application program does not have a file with suspicious code (step 806 to step 805). Otherwise, when the application program has a file with suspicious code, the application program is deemed to be fake antivirus (step 806 to step 807).

Techniques for detecting fake antivirus have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting fake antivirus in a computer, the method comprising:
   retrieving text content of a graphical user interface (GUI) window of an application program;
   classifying the text content to determine that the application program belongs to an antivirus category;
   scanning a file of the application program for obfuscated binary code indicative of a fake antivirus; and
   deeming the application program to be fake antivirus based on a finding that the application program belongs to the antivirus category and the file of the application program has obfuscated binary code indicative of a fake antivirus.

2. The method of claim 1 wherein retrieving the text content of the GUI window of the application program comprises:
   intercepting text changing operations performed by the application program to change text of the GUI window.

3. The method of claim 2 wherein retrieving the text content of the GUI window of the application program further comprises:
   performing optical character recognition (OCR) on a painted portion of the GUI window of the application program to obtain an OCR text output.

4. The method of claim 1 wherein the file of the application program comprises an executable file of the application program.

5. The method of claim 1 further comprising:
   training a learning model using keywords of antivirus programs to generate a classifier.

6. The method of claim 5 wherein classifying the text content comprises:
   inputting the text content of the GUI window of the application program to the learning model.

7. A method of detecting fake antivirus in a computer, the method comprising:
   receiving text content of a user interface of an application program;
   finding that the application program belongs to an antivirus category based on a classification of the text content of the user interface of the application program; and
   scanning a file of the application program for obfuscated binary code indicative of a fake antivirus.

8. The method of claim 7 further comprising:
   deeming the application program to be fake antivirus based on the finding that the application program belongs to the antivirus category and the file of the application program has obfuscated binary code indicative of a fake antivirus.

9. The method of claim 7 wherein the user interface of the application program comprises a graphical user interface (GUI) window of the application program.

10. The method of claim 9 wherein receiving the text content comprises:
    extracting the text content from a bitmap of the GUI window.

11. The method of claim 10 further comprising:
    intercepting text changing operations performed by the application program to change text of the GUI window.

12. The method of claim 11 wherein receiving the text content comprises:
    performing optical character recognition (OCR) on a painted portion of a graphical user interface (GUI) window of the application program to receive a first portion of the text content;
    intercepting text changing operations performed by the application program to change text of the GUI window to receive a second portion of the text content; and
    providing the first portion and second portion of the text content to a learning model to obtain the classification and find that the application program belongs to the antivirus category.

13. The method of claim 10 wherein extracting the text content from the bitmap of the GUI window comprises:
    performing optical character recognition (OCR) on a painted portion of the GUI window to obtain an OCR text output.

14. The method of claim 7 wherein the file of the application program comprises an executable file of the application program.

15. The method of claim 7 further comprising:
    training a learning model using keywords of antivirus programs to generate a classifier.

16. The method of claim 15 wherein classifying the text content comprises:
    inputting the text content of the user interface of the application program into the learning model.

* * * * *